3,549,263
APPARATUS FOR DETECTING FOREIGN MATTERS MIXED WITH POWDERED OR GRANULAR MATERIALS

Hideo Osawa, Yokohama-shi, Masanori Imooka and Fukuo Taniguchi, Kawasaki-shi, and Sunao Yamashita, Tokyo, Japan, assignors to Tokyo Shibaura Electric Co., Ltd., Kawasaki-shi, Japan, a corporation of Japan
Filed Jan. 21, 1969, Ser. No. 792,505
Claims priority, application Japan, Jan. 24, 1968, 43/3,702; May 6, 1968, 43/29,802
Int. Cl. G01n *21/16, 21/48*
U.S. Cl. 356—209      6 Claims

ABSTRACT OF THE DISCLOSURE

An apparatus for detecting foreign matters mixed with powdered or granular materials comprises means to convey the materials at a predetermined speed, a source of laser beam to emit parallel laser beams, scanning means including a rotatable reflecting member to cause the laser beam from said source to project upon the materials and to deflect portions of laser beams reflected from the material and passing through substantially the same path as the projected beam toward a predetermined direction, means to convert variations in the quantity of the light rays deflected by said scanning means into electrical signals and means responsive to said electrical signals to detect the presence of foreign matters.

---

This invention relates to an apparatus for detecting foreign matters which are mixed with powdered or granular materials by virtue of a difference of a light reflection factor between mixed materials.

To detect foreign matters mixed with a powder such as powdered sugar or crystals of sodium glutamate, the difference in reflection factor or reflection coefficient of the powder to be examined and of foreign matters may be used. For example, light is projected on a stream of powder moved by a suitable transfer device such as a belt conveyer and the light rays randomly or diffusively reflected from the surface of the powder are measured by a photo-electric converting device or a photo-responsive device. Deviation of the intensity of the reflected light or the photo-response from a predetermined range generally means the presence of the undesirable foreign matters in the material to be examined.

Where it is desired to detect foreign matters of the particle size substantially the same or smaller than that of the powder to be examined, it will be apparent that the smaller is the portion or the area in which reflection factor is measured, the higher is the accuracy of the detection. For this reason, the area subject to the measurement is selected relatively small and is moved or scanned in a direction substantially perpendicular to the direction of flow of the powder to measure the reflection factor of the whole area sequentially. In a prior device a plurality of light sources located at independent positions are utilised to illuminate the powder with an intense light, so that a light-responsive device can respond to the light rays reflected from only a particular portion of the powder or a relatively small area which is scanned in the predetermined portions of the stream of the powder by the rotation of a rotating mirror. In this case, a predetermined particular portion of the whole reflected light selected by the rotating mirror is measured by the photo-responsive device to improve the accuracy of the measurement. However, narrower the area of said portion, the more reduced will be the amount of light reflected therefrom. As a result, even when light sources of a large light flux are used, the portion thereof is not selected so small that accurate measurements can not be expected.

When particles of foreign matters having smaller reflection factor (for example particles of black color) are mixed with particles of higher reflection factor (for example powdered white sugar), as the light does not enter into interstices between particles of sugar, such interstices are often observed as the foreign matters.

It is an object of this invention to provide an apparatus for detecting foreign matters mixed with powdered or granular materials wherein the light path of the incident rays projected upon the materials to be measured and that of the measuring light rays among light rays reflected from the materials are made to substantially coincide for the purpose of eliminating erroneous detection described above and wherein the shortage of the intensity of the light rays caused by utilising only a portion of the reflected light rays is compensated for by utilising a source of laser light as the light source.

Another object of this invention is to provide a detecting apparatus utilising a laser device or an optical maser device so that foreign matters mixed with granular or powdered materials can be accurately detected even when there is a substantially disturbing light.

Yet another object of this invention is to provide a foreign matter detecting apparatus having means to supply materials to be detected capable of exposing foreign matters buried in the stream of the powder to the scanning action.

According to one aspect of this invention, there is provided an apparatus for detecting foreign matters mixed with powdered or granular materials to be examined by using the difference in the reflection factor of light of said materials and said foreign matters: comprising means to convey said materials to be examined; a source of laser beam emanating fine parallel light beam; scanning means including a rotating reflector positioned on the path of said laser beam and to reflect said laser beam to scan said materials, said rotating reflector also reflecting a portion of reflected light rays reflected from the surface of said powder along a path which is substantially the same as that of said scanning laser beam but in the opposite direction; separating means positioned between said source of laser beam and said scanning means to permit travel of said laser beam from said source toward said scanning means and to reflect said light rays reflected from said scanning means toward a predetermined direction; photo-responsive means located to receive light rays reflected from said separating means to produce electrical signals responding to the intensity of light having substantially the same wavelength as that of said laser beam; a synchronising signal generator to generate synchronising signals corresponding to said scanning action of said laser beam across said materials; gate means controlled by said synchronising signals to pass said electric signals during scanning of the surface of said materials; and means responsive to signals passing through said gate means to detect the presence of said foreign matters in said materials.

The invention can be more fully understood from the following detailed description taken in conjunction with the accompanying drawings, in which.

Figure 1:
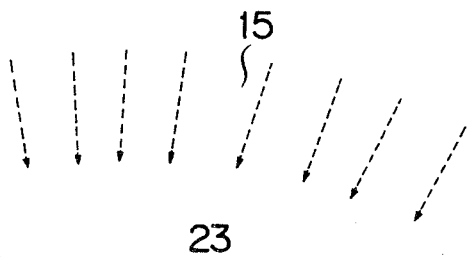
FIG. 1 is a diagram illustrating the direction of light beams and magnified particles of materials to explain this invention and the background thereof.
Figure 1:
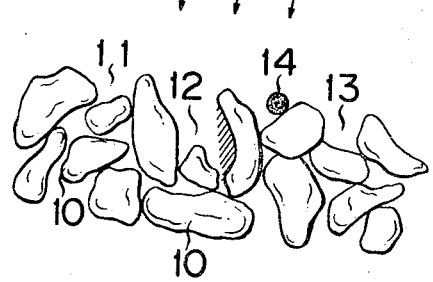

With reference first to FIG. 1 of the accompanying drawings, particles of white sugar, for example, are designated by reference numeral 10 and are loosely stacked with interstices therebetween. At the surface of the stack, large interstices are seen as depressions or recesses 11, 12 and 13. A particle of a foreign matter having lower index of reflection than particles 10 is designated by a reference numeral 14 and it is assumed herein that the colour of particle 14 is black for example. Assuming now that, as shown by a numeral 15, light rays are projected upon the powder or the object being detected from a plurality of light sources, not shown, located at discrete positions, such light rays cannot enter some of the recesses. For example, the shaded portion of recess 12 is illuminated by light rays coming from the right. Thus, the intensity of illumination at that portion is low with the result that light rays reflected therefrom is little and the prior art detecting device constructed as above described observes such a portion as a dark spot or a foreign matter.

Figure 2:
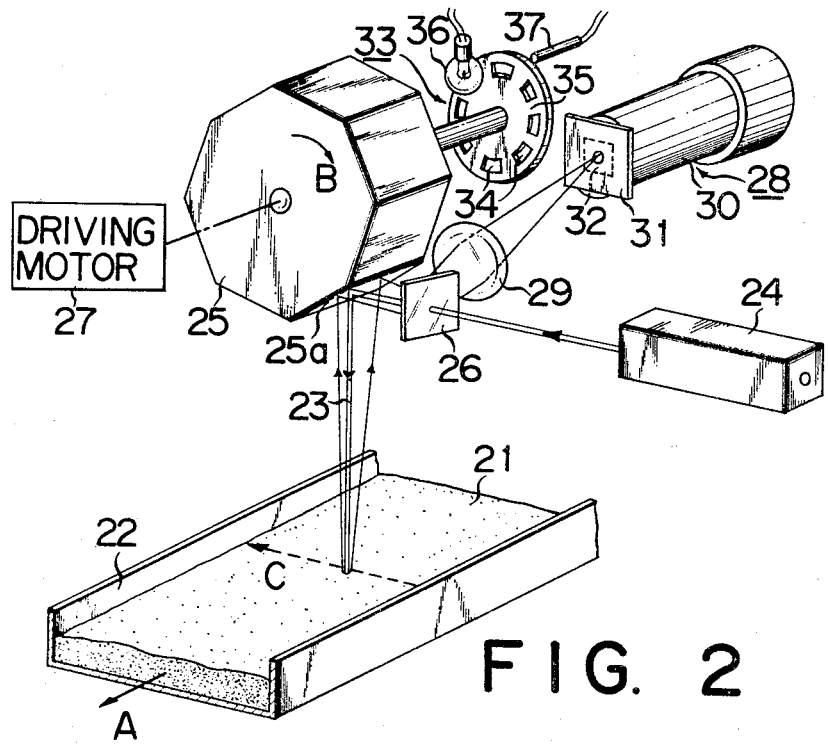
FIG. 2 is a perspective view of one embodiment of the detecting apparatus according to the invention.

Referring now to FIG. 2, a preferred embodiment of this invention shown therein is especially suitable for detecting foreign matters mixed with a powdered material such as white crystals of sodium glutamate or particles of white sugar. The powder to be examined is designated by reference numeral 21 and is conveyed in a direction indicated by arrow A at a speed of 20 cm./sec., for example, by means of a suitable transfer means such as a conveyor 22 with side walls on the opposite sides. Light rays 23 projected upon the stream of the powder are emanated from a source of laser beam or an optical maser device 24. As the light source 24 may be utilised a He-Ne gas laser which can produce a narrow and intense beam of extremely parallel light rays having a wavelength of 6328 angstrom, the diameter of the beam being 3 to 5 mm., for example. A rotating reflecting mirror 25 is provided on the path of the laser beams to reflect the laser beams transmitted through a half mirror 26 which is positioned at a suitable inclination as will be described later in more detail thus projecting the beam upon the powder 21. Rotating reflector 25 comprises a plurality of (for example eight) substantially equal rectangular plane mirrors 25a which are arranged at the same distance from the axis. The mirror is rotated by a suitable driving mechanism such as a motor 27 in a direction of arrow B at a predetermined and substantially constant speed, for example 5000 r.p.m., which is sufficiently higher than the flow speed of the powder 21 so as to reflect the laser beam to cause it to scan in a direction shown by a dotted arrow C.

Upon the condition shown in FIG. 2, reflecting member 25a of the rotating mirror operates also to reflect the beams reflected by the powder 21 toward half mirror 26. Among the reflected light rays caused by an irradiation of a scanning spot of the laser beam to the powder 21, only beams from relatively small portion which arrive at the rotating mirror can be projected onto the half mirror 26, said portions being substantially subject to the measurement of intensity and being limited by the dimensions of the component mirror sections, such as 25a. It is to be noted that up to half mirror 26 reflected light rays travels along a path substantially the same as that of the incident rays emitted from laser device 24, but in the opposite direction. Half mirror 26 reflects substantially all of the light rays received from mirror section 25a toward a photo-responsive means generally designated by a reference numeral 28.

Half mirror 26 has a well known construction that permits free transmission of the laser beam emanated from the laser light source but reflect light rays received from the rotating mirror toward a predetermined direction. Thus, the half mirror segregates the path of the reflected light rays or the measuring light rays from the path of the incident light rays at a predetermined point. If the cross-sectional area of the beams emanated from the laser light source were sufficiently smaller than that of the measuring light, the half mirror 26 could be substituted by an ordinary mirror positioned to direct the laser beam reflected by the mirror section 26a toward the photo-responsive means and provided with a smaller perforation enough to transmit the laser beams from the laser light source. In some case, the ordinary mirror may be displaced from the path of the laser beams so that they can directly arrive at the rotating mirror. Although this construction is simple in construction, the deviation of the range of the reflected rays to be measured from the path of the incident light rays becomes larger than in the illustrated arrangement.

Although not always necessary, a condenser lens 29 may be provided between half mirror 26 and photo-responsive means 28 which may be a suitable photo-responsive element that converts the intensity of light into an electrical signal in response to a weak light and may comprise a photo-multiplier 30, a shielding plate 31 with a small perforation which limits the quantity of light to the photo-multiplier, an interference filter 32 mounted on the shielding plate on the side thereof facing to the photo-multiplier. However, any suitable equivalent photo-responsive element can be used. An optical interference filter which manifests different percentages of transmission for light rays of different wavelengths by utilising the interfering phenomena of light waves is characterised by transmitting only light rays having substantially the same wavelength as that of the laser light. The provision of shielding plate 31 and interference filter 32 enable the photo-multiplier to be prevented from responding to disturbing light to give erroneous detection.

As above described, incident laser beam 23 is caused to scan in the direction perpendicular to the direction of advance of the powder by the rotation of the rotating mirror 25. However, as the incident laser beam scans not only the powder 21 but also other portions or portions outside stream of the powder, light rays reflected from such portions are also directed to photo-responsive device 28. In order to eliminate signals produced by photo-multiplier 30 due to light rays reflected from these portions outside the stream of the powder, a synchronising signal generator is provided and generally designated by a reference numeral 33. Synchronising signal generator 33 comprises a circular disk 35 mounted on the shaft of the rotating mirror in coaxial relation therewith and provided with a suitable number of perforations or slits 34 in its periphery, and a light source such as an electric lamp 36 and a photo-responsive element, for example, a photocell 37 which are disposed in opposed relationship on the opposite sides of the disk. Thus, photocell 37 responds to the light which is emanated from lamp 36 and passes through slits 34 in the disk 35 moving in synchronism with the rotation of the mirror 25. Slits 34 are arranged such that only when the laser beam is scanning the powder 21, the photocell 37 receives the light from the lamp 36. It will be understood that the synchronising device may be comprised by a proximity switch and the like which are substituted for the light source and the photocell.

Figure 3:
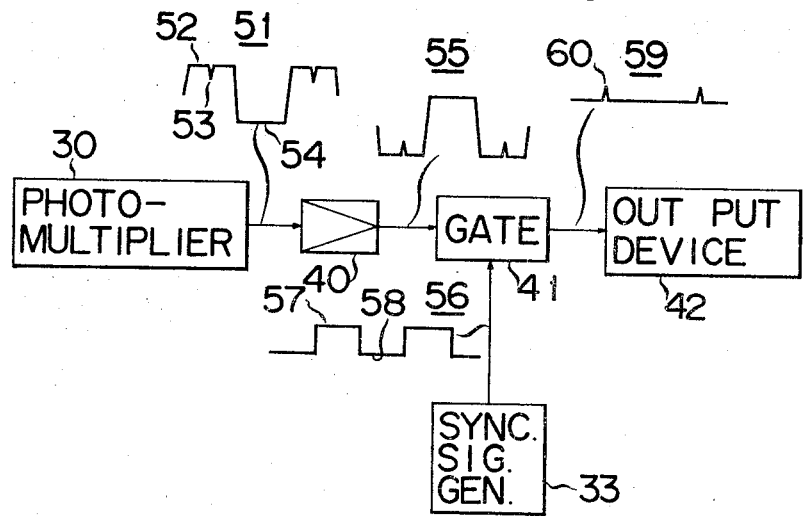
FIG. 3 is a block diagram of the electric circuit employed in the detecting apparatus shown in FIG. 2.

Referring now to FIG. 3 which illustrates a block diagram of the electrical circuit of the embodiment shown in FIG. 2, electric signals from the photo-multiplier 30 which correspond to measuring light intensity are amplified by an amplifier 40 and the amplified signals are applied to a gate circuit 41. The gate circuit 41 is controlled by signals from the synchronising signal generator 33 to transmit signals applied to its input to the output only when the scanning beam is projected upon the powder. The gate 41 may be comprised by a chopper circuit including a transistor circuit. Output device 42 receives signals that have passed through the gate circuit 41 and comprises a level detector such as a Schmitt circuit or a comparator which functions to discriminate whether the level of the signals exceeds a predetermined setting or not, and means responsive to the output from the level detector to effect removal of foreign matters or alarming.

As shown in FIG. 1, laser beams 23 are caused to scan across particles 10. The laser beams impinge upon the surface of the layer of the particles substantially at right angles. The perforation of plate 31 of the photo-responsive device is disposed to receive portions of the reflected light which proceeds along substantially the same path as the incident beam 23 but has a slightly wider range and the photo-multiplier 30 responds only to light rays of a wavelength that can transmit through interference filter 32 provided on the back of plate 31 among light rays impinging upon the perforation of plate 31.

Since a laser device can emanate extremely parallel fine light rays of high intensity without utilising a large reflecting mirror and a condenser lens, portions not sufficiently illuminated by the incident light decrease materially when compared with a case wherein the surface is illuminated by the light from the other type of light source. Moreover, as the laser light is monochromatic and as the interference filter can separate substantially only the reflected light rays caused by the laser light, the photo-multiplier does not respond to disturbing light. In this manner, by measuring only portions of diffusively reflected light which proceed along substantially the same path as the incident beam but in the opposite direction, it is possible to readily detect the difference in reflection factor of the object or powder conveyed by the conveyer 22 in the relatively light room.

In this manner, since the reflected light measured by the photo-multiplier 30 is the light that is reflected along the path of the incident beam 23, the shaded portion of the depression or the interstice between particles will not be observed as a dark portion. In other words, dark portions manifested by not receiving the incident beam will never be detected as foreign matters. On the other hand, black foreign matter 14 has lower reflection factor than white particles so that it is positively observed as a dark portion.

The operation of the electric circuit will now be considered with reference to FIG. 3 wherein 31 illustrated one example of the output waveform the photo-multiplier. So long as the scanning beam impinges upon white particles the output shows a high level as shown at 52 whereas when the beam comes to impinge upon the foreign matter the output decreases to a slightly lower level 53. Level 54 shows the level of the output signal produced when the scanning beams impinge upon portions other than the stream of the powder. When amplifier 40 is of the phase inversion type, its output is shown by a waveform 55. For simplicity, it is shown disproportionally. A waveform 56 represents the output waveform of the synchronising signal generator which manifests a high value 57 when the laser beam is scanning across powder 21 whereas a low value 58 under other conditions. Consequently, gate circuit 41 operates to transmit input signals thereof to the output device 42 when the synchronising signal assumes the high value. In this manner, when a dark portion is detected the output of gate circuit 41 assumes a high value 60 as shown by a waveform 59. The level detecting means in the output device identifies an input signal as a foreign matter when it has a value higher than a predetermined level. However, as mentioned above, since the shaded portion in depression 12 shown in FIG. 1 does not form a dark portion, the presence of any dark portion substantially means the presence of a foreign matter of low reflection factor. Thus, the probability of erroneous detection is very small.

While the foregoing description has been made in terms of the detection of foreign matters having lower reflection factor of light than that of the object to be examined, this invention is also effective for applications where the reflection factor of the foreign matters is higher than that of the object.

Figure 5:
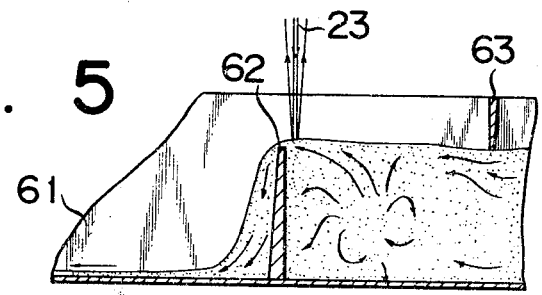
FIG. 5 shows a longitudinal section of the powder supply device shown in FIG. 4 taken along a line 5—5 thereof.
Figure 4:
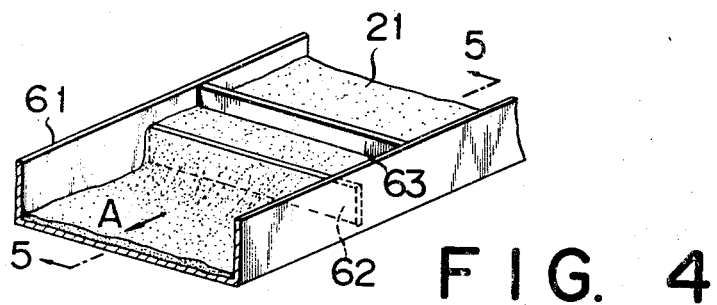
FIG. 4 is a perspective view of a powder supply device embodying this invention.

FIGS. 4 and 5 show a different embodiment of supplying device for the powder to be examined. As can be noted from the description regarding the previous embodiment shown in FIG. 2, although this invention can detect foreign matters in the surface layer of the stream of powder, it can not detect foreign matters in deeper portions of the stream or those not irradiated by the laser beam.

In the modified embodiment shown in FIGS. 4 and 5, reference numeral 61 designates a guide chute having a cross-sectional configuration of a letter U which is connected to a suitable vibration generator (not shown) to be subjected to horizontal vibrations of small amplitudes. A dam 62 is provided in the guide chute 61 to project upwardly from the bottom to a predetermined height across both side walls, thus serving as a barrier for the stream of the powder which is supplied to the right-hand portion of guide chute 61 by any suitable means, not shown. The guide chute is vibrated so that the powder flows in a direction indicated by arrow A. As can be clearly noted from the drawings the stream of the powder is blocked by the dam 62 and then gradually overflows the same. The laser beams 23 are projected to scan portions of the powder on the upstream side of dam 62 to scan powders which are presently to overflow the dam.

Although particles of the powder on the upstream side of dam 62 flow along very complicated paths as shown by arrows in FIG. 5, dependent upon the mode of movement of guide chute 61 and the characteristics of the particles, experiment shows that it is easy to cause substantially all particles to overflow dam 62 after they have passed through surface portions on a slightly upstream side of the dam. Thus, by examining the powder by means of laser beams at portions on the upstream side of dam 62, substantially all foreign matters contained in the powders that overflow dam 62 can be detected without the fear of not detecting foreign matters buried in the stream.

Scanning of the laser beams on the slightly upstream side of dam 62 means that portions of particles once examined thereby are not required to overflow the dam before next scanning. Such portions are merely examined repeatedly. Thus it is easy to prevent not yet examined portions of the particles from overflowing the dam. It will be apparent that the height of the dam 62 should be sufficiently high to keep the existence of the powder in the portions scanned by the laser beam. If the bottom of the guide chute 61 were exposed at such portions, such portions would be detected as foreign matters.

Where it is desired to prevent an excess supply of the powder to guide chute 61, a second dam 63 may be provided which is effective to limit the thickness of the layer of the powder in order to maintain the surface of the stream of the powder to a level less than a predetermined level. Dam 63 is provided on the upstream side of dam 62 across opposite sides of guide chute 61 to extend downwardly from the upper edges thereof thus defining a gap for the powder stream between its lower edge and the bottom of the guide chute.

What is claimed is:

1. An apparatus for detecting foreign matters mixed with powdered or granular materials to be examined by using the difference in the reflection factor of light of said materials and said foreign matters; comprising means to convey said materials to be examined; a source of laser beam emanating a fine parallel light beam; scanning means including a rotating reflector positioned on the path of said laser beam and to reflect said laser beam to scan said materials, said rotating reflector also reflecting a portion of reflected light rays reflected from the surface of said materials along a path which is substantially the same as that of said scanning laser beam but in the opposite direction; beam separating means positioned between said source of laser beam and said scanning means to permit travel of said laser beam from said source toward said scanning means and to reflect said light rays reflected from said scanning means toward a predetermined direction; photo-responsive means located to receive light rays reflected from said beam separating means and to produce electrical signals corresponding to the intensity of light having substantially the same wavelength as that of said laser beam; a synchronising signal generator coupled to said scanning means to generate synchronising signals corresponding to said scanning action of said laser beam across said materials; gate means coupled to said photo-responsive means controlled by said synchronising signals to pass said electric signals during scanning of the surface of said materials; and means responsive to signals passing through said gate means to indicate the presence of said foreign matters in said materials.

2. An apparatus according to claim 1 wherein said conveying means comprises a chute vibrated in the horizontal direction and a dam provided in said chute to extend upwardly from the bottom of said chute and wherein said laser beam is disposed to scan portions of said powder on the upstream side of said dam.

3. An apparatus according to claim 2 wherein said conveying means further comprises a second dam provided on the upstream side of said dam, said second dam extending from the upper edge from said chute toward the bottom thereof to form a gap between the lower end of said second dam and said bottom.

4. An apparatus according to claim 1 wherein said photo-responsive means comprises a photo-multiplier and an interference filter, said interference filter preceding said photo-responsive means.

5. An apparatus according to claim 1 wherein said synchronising signal generator comprises a disk shaped member rotated in synchronism with said rotating reflector provided with said scanning means and a switch means operated by the rotation of said disk shaped member.

6. An apparatus according to claim 1 wherein said beam separating means consists of a half mirror.

References Cited
UNITED STATES PATENTS 3,061,731   10/1962   Thier et al. _____ 356—200
3,360,651   12/1967   Linderman _____ 356—200

RONALD L. WIBERT, Primary Examiner

C. CLARK, Assistant Examiner

U.S. Cl. X.R.

356—237